United States Patent [19]
Johnston

[11] 3,932,031
[45] Jan. 13, 1976

[54] SIDE AND CORNER GLARE EYE SHADE
[76] Inventor: William V. Johnston, Omaha, Nebr.
[22] Filed: Oct. 9, 1973
[21] Appl. No.: 404,138

Related U.S. Application Data
[63] Continuation of Ser. No. 136,913, April 23, 1971, abandoned.

[52] U.S. Cl. .......................................... 351/47; 2/13
[51] Int. Cl.² ............................................. G02C 9/04
[58] Field of Search ............. 2/13, 14 J; 351/44, 47, 351/48, 57, 58

[56] References Cited
UNITED STATES PATENTS

| | | | |
|---|---|---|---|
| 2,932,066 | 4/1960 | Lindblom | 2/13 X |
| 3,436,761 | 4/1969 | Liautaud et al. | 2/13 |
| 3,505,679 | 4/1970 | Bennett | 2/13 |
| 3,536,385 | 10/1970 | Johnston | 351/47 |

*Primary Examiner*—Paul A. Sacher

[57] ABSTRACT

A side shade attachable to a bow of a pair of spectacles and having a main portion hanging therebeneath but also a transverse shaped portion attached thereto and adapted to lap the adjacent side edge of a frame of the spectacles for closing out glare from coming to the wearer's eye from the area immediately rearward of the front of the spectacles.

7 Claims, 6 Drawing Figures

SIDE AND CORNER GLARE EYE SHADE

This is a continuation of application Ser. No. 136,913, filed Apr. 23, 1971 and now abandoned.

FIELD OF THE INVENTION

This invention is in the field of side shades attachable to eye glasses and positioned at the side of the wearer's head and adapted to be used in companionship with either colored lenses of the spectacles or else colored forward shades of the clip-on type.

DESCRIPTION OF THE PRIOR ART

In the prior art it has been possible for persons who do not need corrective lenses to purchase what can be called "wrap-around" eye shades which are commonly called sun glasses but which are actually quite often made of colored plastic. The effect of such wrap-around plastic shades or spectacles is to prevent glare from reaching the wearer's eyes not only from the front, but also from the side, as is very important.

This importance is particularly the case for people who drive great distances or whose business life is a combination of close eye work and being outdoors in the brightness of the sun.

These advantages have not been available to the unfortunate person who must wear corrective lenses.

A person who wears corrective lenses can go to most drugstores and buy clip-on sun glasses which cover only the forward part of the spectacles, leaving the eyes to painfully receive glare from the side.

It is true that in the past side shields have been proposed to clip on the bows of eye glasses, but these have not reached common availability on the market, perhaps because they are faulty in that they always leave a substantial "glare-gap" between the side edge of the front of the frame of the spectacles and the side shield.

The problem is quite great because of the extensive variety in the shapes and sizes of the side edges of the forward parts of the frames of the many styles of spectacles.

In my earlier U.S. Pat. No. 3,536,385, "SPECTACLE-MOUNTED EYE SHADE", issued Oct. 27, 1970, to William V. Johnston, a special two-part eye shade set was proposed in which the forward part had outer edges extending rearwardly to lap the side shade portions. However, that construction had disadvantages. One serious disadvantage is that people have heads of varying widths, and so their spectacles have varying widths, and a forward portion wide enough to fit one person's spectacles would be too wide to fit another, leaving many merchandising and supply problems, the cost of extra dies for manufacture, and other difficulties.

The side shade portions of my earlier patent could not be used effectively with common clip-on sun glasses of the type that clip onto the forward sides of regular spectacles because they had no provision for taking care of the "glare-gap" above-mentioned.

And so, to this day, it is still not possible for most people to go to their drugstore and purchase a complete solution to the problem of front and side shade for a person who has the handicap of corrective lens spectacles.

A disadvantage of great importance in the shade structure shown in my earlier patent is that the forward shade portion would necessarily have to be made out of some sort of thermoplastic material of inferior optical quality to ground lenses, and it is an object of this invention to provide a side shade adapted to be used with front shade lenses of high quality whether they be of clip-on type or built-in type.

It is unimportant that side shades be of high optical quality, but very important that forward shade portions be of high optical quality, whether they be clip-on type, or otherwise. I am aware that side guards or shields have been proposed in clear material not for sun glare protection but for protection from flying objects and involving a transverse portion attached to a main portion which latter is riveted to glasses' bows. However, a great difference exists because in a guard there is no need for a lapping of the respective side of the glasses' frame since it is not needful to merchandise such a side shield in a form to adapt to spectacle frames of various shapes or to be adapted to the latter by trimming. There is a fitting problem with the side glare shades of my invention which are to be mass marketed — a problem which this invention solves.

Most spectacle bow mounted side shields have been for the purpose of shielding the eyes from moving objects. In other words, safety shielding so that such side shields have been of clear plastic — not tinted. It is only where the side shades are tinted that the "glare gap" above mentioned is a problem. Where side shades are tinted and have a transverse portion extending over to the adjacent edge of the lens supporting portion of the spectacle frame, that there is a "glare gap" problem, unless the transverse portion laps the frame, which is my invention, the glare gap existing when the transverse portion does not tightly fit against the adjacent edge of the spectacle frame portion. The lack of a tight fit would be a major problem in merchandising because spectacles are so many different shapes. Lapping is an excellent solution because where there is lapping, the exact shape is not so critical and a buyer can adapt the shape somewhat himself by cutting the terminal edge with a pair of scissors. Elimination of the "glare gap" by the lapping is especially important where sun is shining through the side window of a car.

SUMMARY OF THE INVENTION

A side and corner glare eye shade adapted not only to prevent glare from reaching a wearer's eye from the side, but also to substantially prevent flare from reaching the wearer's eye from the "corner" between a main side shade portion at the side of the spectacles and whatever means is used to shade the forward side of the spectacles, which latter can be having the lenses of the spectacles themselves of a shade nature, or having clip-on sun glasses placed over the front of the spectacles, the main shade portion being adapted to hang substantially beneath a glasses' bow, a suitable means attaching the main shade portion to the bow, and a transverse shade portion disposed transversely to the main shade portion in use and extending inwardly for lapping the outer side edge of the adjacent lens-supporting forward frame portion of the spectacles or "glasses" on which they are mounted.

The main shade portion and the transverse shade portion being integrally made of the same piece of material or else closely spaced so that substantially no light can be passed between the main shade portion and the transverse shade portion, and in the latter alternative means being provided for securing the transverse shade portion to the main shade portion.

Means for attaching the side shade portion comprising means generally U-shaped when seen in a vertical plane extending transversely of the main shade portion and downwardly opening so as to be placeable onto the bow of a pair of conventional corrective lens spectacles from the top, the U-shaped attaching means being substantially resilient. A particular object of this invention is to provide a transverse side shade portion of a horizontal width for extending transversely of the main side shade portion in use far enough for substantially lapping the outer side edge of an adjacent lens-supporting forward frame portion of conventional spectacles on which the side shade is mounted.

A further object is to provide the concept of having the transverse portion extending so far that most users of conventional spectacles would prefer to trim some of the transverse portion off in order to make adjustment to their own particular case.

DESCRIPTION OF THE PREFERRED EMBODIMENT

Figure 1:
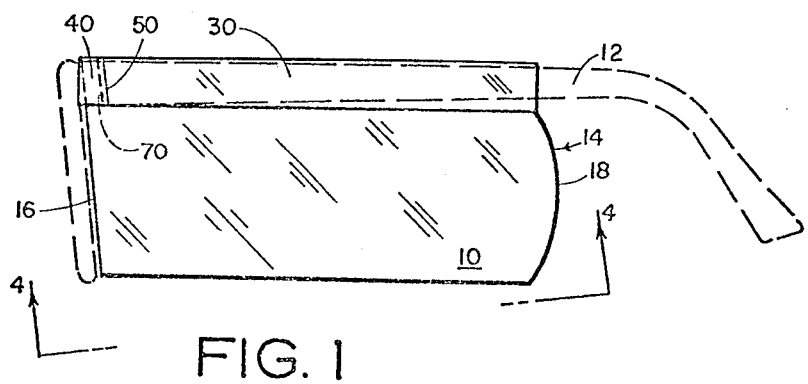
FIG. 1 is a side elevation of a left-hand side shade as it would be seen from the left-hand side of a pair of spectacles, the spectacles being shown in dotted lines, the transparency of the shade causing edges of a far side thereof to be seen in full lines.
Figure 2:
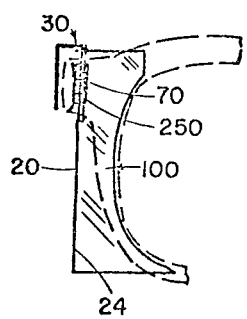
FIG. 2 is a rear elevation of the side shade of FIG. 1 with portions of the spectacles shown therein in dotted lines, a rearward portion of a bow of the spectacle not being shown.
Figure 3:
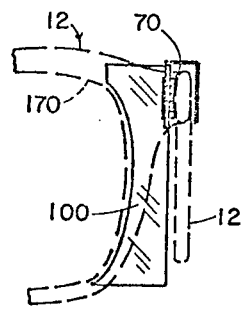
FIG. 3 is a frontal elevation of the side shade of FIG. 1 seen in the position lapping the rearward side of the left portion of the front frame of a pair spectacles, the latter shown in dotted lines.
Figure 4:
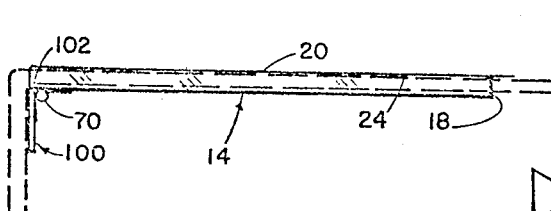
FIG. 4 is a bottom view of the side shade and the spectacles of FIG. 1 as seen along the line 4—4 of FIG. 1.

The side shade of this invention is generally indicated at 10 in FIG. 1, and as shown, is attachable to a bow of a pair of conventional corrective lens spectacles shown in dotted lines at 12.

The side shade 10 has a main shade portion 14 having forward and rearward ends 16 and 18 and right and left sides seen at 20 and 24 respectively, and is adapted to hang in a position substantially beneath the bow 12.

The side shade 10 has means 30 attaching the side shade 10 to the bow 12. The attaching means 30 is generally U-shaped when seen from the rear or when seen from a vertical plane extending from right to left transversely of the main shade portion 14 and is open on the underside so as to receive a glasses' bow 12 therein. For strength, the U-shaped attachment portion 30 preferably extends substantially from one end to the main shade portion 14 to the other. It is important, however, that the inner side, which in the example shown is the right side portion 24 of the U-shaped attachment means 30, be provided with a notch 50, seen in FIGS. 5 and 6, for receiving therein the hinge 70 at the forward inner side of the glasses' bow 12, since the hinge juts out inwardly from the glasses' bow 12.

Figure 5:
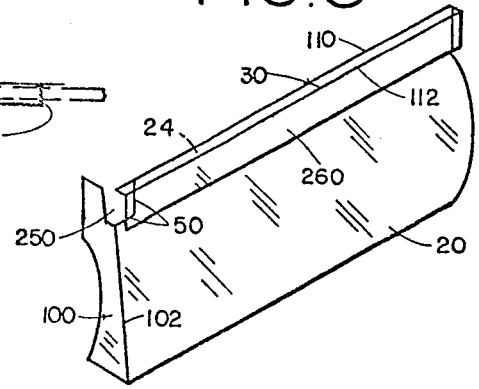
FIG. 5 is a perspective view of the shade of FIG. 1 as seen from above and to the left side thereof.
Figure 6:
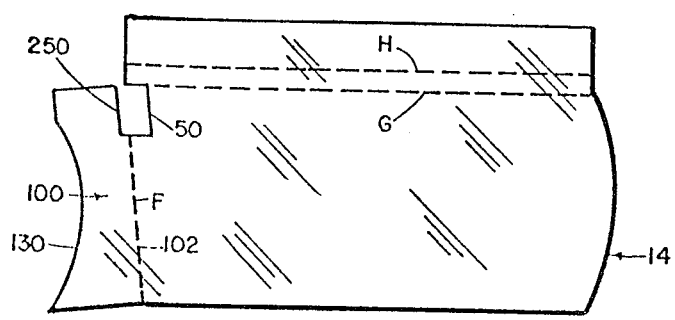
FIG. 6 is a view of a flat piece of material cut to form the side shade of FIG. 1, dotted lines showing fold lines to be used.

The side shade 10 further has a transverse shade portion 100 having an outer edge 102 which is upright and which is attached to the main shade portion 14 integrally, or is suitably secured. When integrally attached, the entire side shade can be made from a single integral piece of material shown in FIG. 6 with the fold line at F extending upright to form the edge 102 and with approximately horizontal fold lines at G and H shown in dotted lines in FIG. 6. The fold line G forms an upper inner or right-hand corner 110 of the U-shaped portion 30 and the fold line H parallel to the fold line G forms the outer left-hand corner 112 of the U-shaped portion 30, as best seen in FIGS. 5 and 6.

The transverse portion 100 has an inner upright concave arcuate edge 130 which is shaped complementally to the inner edge of the adjacent upright upper portion of the forward section 170 of the spectacles 12.

It may be that in the market situation that it is best for the transverse portion to be of a greater right-to-left thickness, or rather, width than needed for most spectacles whereby if it overlaps the frame to excess, the customer can take a pair of scissors and trim back the edge 130 somewhat to adapt to the size and shape of his actual pair of spectacles.

It is preferred that the side shade be entirely made of a single piece of flexible, bendable, but form-holding and resilient thermoplastic material that is at least translucent and preferably transparent with coloring. Such material can be cut with scissors for the purpose described.

Referring to FIG. 6, it will be seen that the upper outer edge of the transverse portion 130 has a notch 250 therein further adapting it to receive the hinge 70 so that the transverse portion 100 can lie close to and parallel with the rearward side of the forward portion of the glasses' or spectacles' frame.

The downwardly depending terminal outer side portion of the U-shaped attachment portion 30 is shown at 260 and is spaced a substantial distance from the inner side of the U-shaped portion 30 to receive the bow of the spectacles therebetween. It is to be noted that, except by means of spectacles 12 themselves, side shade 10 is free of any connection to any other side shade that might be put on the other side of the spectacles.

I claim:

1. A spectacle and side shade assembly for glare protection comprising a side shade in further combination with a pair of conventional spectacles having a horizontally extending bow and a lens-supporting forward frame portion, said side shade having a main side shade portion having forward and rearward ends and right and left sides and hanging substantially beneath said bow, attaching means connected to said main side shade portion and attaching in an easily removable way said main side shade portion to said bow whereby without using tools a user can manually remove said side shade from said bow and attach said side shade to said bow, a transverse shade portion extending transversely of and to one side of said main side shade portion, said transverse shade portion substantially lapping the outer side edge of an adjacent part of said lenssupporting forward frame portion of said spectacles, said side shade main and transverse portions both being adapted to substantially shade the eyes from glare, except by means of said spectacles said side shade being free of any connection to any other side shade.

2. The assembly of claim 1 in which said material is also transparent for possibility of side vision.

3. The combination of claim 1 in which said entire side shade is made integrally of one piece of material.

4. The assembly of claim 1 in which said main and transverse side shade portions are both formed of flexible and resilient thermoplastic material.

5. The combination of claim 1 in which said main shade portion and said transverse shade portion are made substantially of the same piece of material.

6. The spectacle and side shade assembly of claim 1 in which said attaching means comprises means generally U-shaped as seen in cross-section in a vertical plane extending transversely of said bow and open at the underside thereof and receiving said bow therein.

7. A spectacle and side shade assembly for glare protection comprising a side shade in further combination with a pair of conventional spectacles having a horizontally extending bow and a lens-supporting forward frame portion, said side shade having a main side shade portion having forward and rearward ends and right and left sides and hanging substantially beneath said bow, attaching means connected to said main side shade portion and attaching in an easily removable way said main side shade portion to said bow whereby without using tools a user can manually remove said side shade from said bow and attach said side shade to said bow, a transverse shade portion extending transversely of and to one side of said main side shade portion, said transverse shade portion substantially lapping the outer side edge of an adjacent part of said lens-supporting forward frame portion of said spectacles, said side shade main and transverse portions both being tinted and therefore being adapted to substantially shade the eyes from glare, except by means of said spectacles said side shade being free of any connection to any other side shade, said spectacle assembly being free of any section of said transverse shade portion lapping the center of the adjacent lens of said spectacles, said transverse portion being formed of a thermo plastic material sufficiently thin that it can be cut with a pair of scissors.

* * * * *